United States Patent [19]

Batzer et al.

[11] 4,244,842
[45] Jan. 13, 1981

[54] NICKEL AND COBALT CHELATE COMPLEXES AND THEIR USE

[75] Inventors: Hans Batzer, Arlesheim, Switzerland; Gerrit Knobloch, Lindenfels, Odenwald; Joel Sinnreich, Bensheim, Bergstrasse, both of Fed. Rep. of Germany

[73] Assignee: Ciba-Geigy Corporation, Ardsley, N.Y.

[21] Appl. No.: 11,969

[22] Filed: Feb. 14, 1979

[30] Foreign Application Priority Data

Feb. 21, 1978 [CH] Switzerland .......................... 1848/78

[51] Int. Cl.³ ........................ C07F 15/04; C08L 15/02; C07F 15/06

[52] U.S. Cl. ........................................ 260/3.3; 260/5; 260/439 R; 525/370

[58] Field of Search ......... 260/439 R, 429 J, 45.75 N, 260/45.75 M

[56] References Cited

U.S. PATENT DOCUMENTS

| | | | |
|---|---|---|---|
| 2,768,968 | 10/1956 | Reppe et al. | 260/439 R X |
| 2,771,487 | 11/1956 | Morris et al. | 260/439 R X |
| 3,429,906 | 2/1969 | Swigar et al. | 260/439 R X |
| 3,901,931 | 8/1975 | Rasberger et al. | 260/439 R |
| 3,905,947 | 9/1975 | Cowell et al. | 260/79.5 R |
| 3,997,495 | 12/1976 | Creticos | 260/79.5 R |

*Primary Examiner*—Helen M. S. Sneed
*Attorney, Agent, or Firm*—Luther A. R. Hall

[57] ABSTRACT

The invention provides nickel and cobalt chelate complexes of a nickel or cobalt salt and a succinosuccinate of the formula I

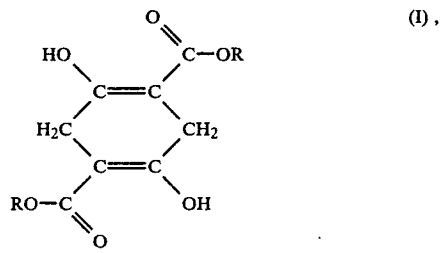

wherein R represents a substituted or unsubstituted hydrocarbon radical of aliphatic or aromatic character. These complexes are excellent adhesion promoters for vulcanized rubber on metal surfaces.

9 Claims, No Drawings

NICKEL AND COBALT CHELATE COMPLEXES AND THEIR USE

The present invention relates to nickel and cobalt complexes and their use as adhesion promoters for vulcanisable elastomers on metal surfaces.

The succinosuccinates of formula I are also known as succinylosuccinates, as 2,5-dioxo-1,4-cyclohexanedicarboxylates (in the keto form) and as 2,5-dihydroxy-1,4-cyclohexadiene-1,4-dicarboxylates (in the enol form).

It is known that nickel and cobalt salts are used as adhesion promoters of vulcanisable elastomers on metal surfaces. Such a method of promoting adhesion is described for example in German Offenlegungsschrift No. 2,447,853. The disadvantage of this method is that it is necessary to use relatively large amounts of the active substances in order to obtain a sufficient adhesion strength. This can result in undesired side-effects. It is the object of the present invention to provide novel chelate complexes with which, when used in small amounts, the same adhesion improvements can be obtained.

Accordingly, the invention relates to nickel or cobalt complexes of a nickel or cobalt salt and a succinosuccinate of the formula I

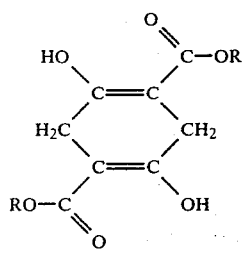

wherein R represents a substituted or unsubstituted hydrocarbon radical of aliphatic or aromatic character.

Suitable nickel or cobalt salts are the salts of inorganic or organic acids, for example nitrates, sulfates, phosphates, fluorides, chlorides, bromides, iodides, cyanides, cyanates. Representative examples of organic acids are carboxylic acids of 1 to 30 carbon atoms, preferably 2 to 18 carbon atoms, such as acetic acid, lauric acid, stearic acid, benzoic acid, malonic acid, phenol and alkylphenols, alkyl- and arylsulfates and alkyl- and arylsulfonates, alkyl- and arylphosphates and alkyl- and arylphosphonates. Suitable nickel or cobalt salts are also nickel and cobalt complexes with other ligands, for example acetylacetonates, benzoylacetonates or quinacridonates. The sulfates, chlorides, bromides and especially the acetates are preferred.

R in formula I as substituted or unsubstituted hydrocarbon radical of aliphatic or aromatic character can be alkyl, alkenyl, cycloalkyl, aryl, aralkyl, alkaralkyl. R preferably contains 1 to 30, in particular 1 to 18, carbon atoms. Aryl and radicals derived therefrom are preferably phenyl and its derivatives, such as phenylalkyl, alkylphenyl or alkylphenylalkyl. Suitable substituents for R are for example hydroxyl, alkoxy, alkylthio.

R as substituted alkyl in formula I can contain 1 to 30, preferably 1 to 18, carbon atoms, and can be for example methyl, ethyl, propyl, isoproply, butyl, isobutyl, pentyl, hexyl, heptyl, octyl, 2-ethylhexyl, dodecyl, octadecyl, eicosyl, ω-hydroxyalkyl, such as β-hydroxyethyl, γ-hydroxypropyl, 4-hydroxybutyl, 6-hydroxyhexyl, alkoxyalkyl or alkylthioalkyl, such as ω-alkyloxyethyl or ω-alkylthioethyl.

R as substituted or unsubstituted cycloalkyl contains preferably 5 or 6 ring carbon atoms. Examples of substituents are alkyl or hydroxyl. Substituted cycloalkyl is for example cyclopentyl, cyclohexyl, methylcyclohexyl, dodecylcyclohexyl, 4-hydroxycyclohexyl.

An aromatic radical R can be naphthyl, phenyl, alkylphenyl and alkylbenzyl containing preferably 1 to 18 carbon atoms in the alkyl moiety, benzyl or phenylpropyl.

The ratio of metal salt to succinosuccinate in the nickel and cobalt chelate complexes of the invention can be 2:1, 1:1 and 1:2, as the succinosuccinates contain two chelate-forming groups.

If the ratio is 2:1, then two metal atoms are bonded to one succinosuccinic acid molecule, while the free valency of each metal atom is saturated by an organic or inorganic anion. They correspond to the structure

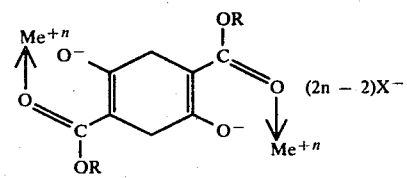

wherein Me represents Ni or Co, n is 2 or 3 and X represents an inorganic or organic radical.

If the ratio is 1:1, the structure has the formula

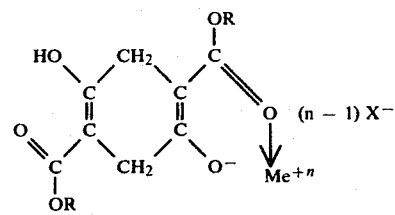

If the ratio is 1:2, the following structure may be presumed:

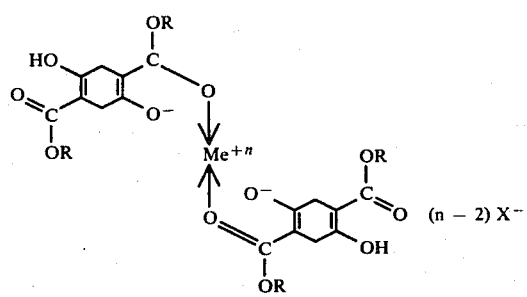

However, it is also possible that the ratio 1:1 embraces oligomer and polymer chelate complexes. These can be illustrated by the formula:

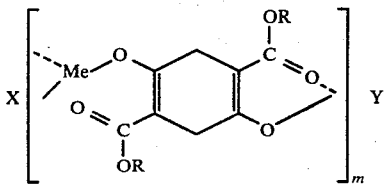

wherein m is an integer greater than or equal to 2, X can be an inorganic or organic anion or the succinosuccinic acid radical and Y can be a hydrogen atom or MeX.

Depending on the molar ratio of the starting materials, mixtures of complex compounds can also be obtained.

The nickel and cobalt chelate complexes of the invention can be obtained in known manner by the reaction of nickel or cobalt salts with succinosuccinates of the formula I. Particularly suitable nickel or cobalt salts are nickel or cobalt acetate. The esters of the formula I are known or they can be easily prepared by transesterification at elevated temperatures from, for example, the methyl or ethyl ester.

The reaction is advantageously carried out in solution. The solvent preferably dissolves the salts and the succinosuccinate. Suitable solvents are polar aprotic and protic solvents, such as ethers, alcohols (to avoid transesterification reactions an alcohol of formula ROH should be used), acid amides, sulfones, sulfoxides, ketones, halogenated hydrocarbons.

Elevated temperatures above 60° C., preferably above 100° C., are suitable for the reaction. In general, the process can be carried out at the reflux temperature of the chosen solvent.

The desired complexes of the invention can be purified in conventional manner by precipitation, washing to remove unreacted starting materials and the solvent, and finally drying.

The metal chelate complexes of this invention are thermally stable and even in low amounts improve the adhesion between metal surface and vulcanised elastomer.

Accordingly, the invention also describes a method of bonding a vulcanisable elastomer mixture to a metal surface during vulcanisation, which comprises adding to a vulcanisable elastomer mixture a nickel or cobalt complex of a compund of the formula I in an amount of 0.05 to 10% by weight, preferably 0.05 to 5% and, in particular, 0.1 to 3% by weight, based on the weight of the elastomer, and vulcanising the mixture while it is in contact with the metal surface in order to effect a permanent bond.

The unsaturated vulcanisable elastomer mixture can be prepared by mixing the constituents of the mixture in conventional manner in a mixer, for example in a Banbury mixer, extruder and/or on a two-roll mixer. After mixing, the mixture is applied to the metal surface and vulcanised. After the mixture has been applied to the metal surface it is normally vulcanised at a temperature between 140° C. and 180° C. The curing time can be varied in accordance with the vulcanising temperature and the desired properties of the vulcanised product, as is known. In general, the adhesion increases with longer curing time. The product of the method just described also constitutes an object of the present invention.

A nickel or cobalt complex of the compounds of the formula I can be used together with any vulcanisable elastomer. All natural and synthetic rubbers can be used according to the invention. Elastomers are for example polydienes, such as polybutadiene or polyisoprene including natural rubber, copolymers of dienes, such as butadiene or isoprene with other copolymerisable monomers (such as styrene, α-methylstyrene, acrylates, methylisopropenyl, ketone, isobutylene, acrylonitrile or unsaturated carboxylic acids), halogenated rubber, such as polychloroprene or fluorinated rubbers, copolymers of one or more monoolefins with a monomer which introduces unsaturated groups into the copolymer, such as an ethylene/propylene/dicyclopentadiene terpolymer, polyurethane rubber which can be vulcanised with sulfur, butyl rubber with at least 0.8% unsaturation, and combinations of the above elastomers, for example natural rubber/butadiene-styrene copolymer mixtures, a mixture of a saturated copolymer of ethylene and propylene with an unsaturated copolymer of ethylene, propylene and a monomer which introduces unsaturated groups into the copolymer.

In addition to containing a nickel or cobalt complex of the compounds of the formula I, the mixtures of the invention can contain other conventional additives, such as accelerators, activators, fracture inhibitors, antioxidants, antiozonants, flame-retardants, antistatic agents, dispersants, extenders, fillers, internal lubricants, plasticisers, processing auxiliaries, inhibitors, adhesives, curing agents, pigments etc. These conventional constituents and additives are added to the elastomer material in an appropriate amount in conventional manner in order to obtain a vulcanisable mixture based on the chosen elastomer.

The vulcanisable mixture, which adheres according to the invention, preferably contains carbon black. The amount of carbon black depends on the desired nature of the product. The mixture preferably contains 25 to 80 parts by weight of carbon black per 100 parts by weight of elastomer.

The use of sulfur as curing agent is preferred, as it is known to facilitate the adhesion of the elastomer mixture to the metal, in particular to brass- or zinc-plated metals. The amount of sulfur in the synthetic rubber mixture can be 0.1 to 25 parts by weight, preferably 0.5 to 10 parts by weight, of the vulcanisable elastomer. The use of the compounds of the invention makes possible a low sulfur content in the mixture.

Examples of eligible accelerators are mercaptobenzothiazole or N-cyclohexylbenzothiazole-2-sulfenamide, for example in an amount of 0.1 to 6 parts by weight per 100 parts by weight of elastomer.

Metal surfaces to which the elastomer mixture is bonded are for example iron or steel, cobalt, nickel, copper, zinc, titanium, vanadium, chromium, tin and their alloys, especially brass and bronze. Preferred metals are steel or brass-, bronze- or zinc-plated steel. It is not necessary to roughen the metal surface before applying the mixture, as the bond between mixture and metal is not mechanical. It is, however, preferable to remove grease and dirt from the metal surface before applying the mixture.

The nickel complexes of the invention are also suitable for stabilising polyolefins.

The invention is illustrated by the following Examples in which the parts and percentages are by weight.

EXAMPLE 1

7.7 g (0.03 mole) of diethyl succinosuccinate (DS) are dissolved in 200 ml of hot ethanol in a nitrogen atmosphere. To this solution are added 13 g (0.06 mole) of nickel acetate and the reaction mixture is subsequently heated under reflux for 30 minutes. The resulting precipitate is collected by filtration and purified by soxhlet extraction with acetone to remove excess DS and afterwards with water and dried in vacuo. The product (10 g) has a nickel content of 18.4% (theoretical value for a 1:1 complex: 18.7%).

EXAMPLE 2

10.2 g (0.04 mole) of DS are dissolved in 150 ml of methyl cellosolve and to this solution is added a solution of 12.8 g (0.04 mole) of cobalt acetate in 400 ml of methyl cellosolve. The reaction mixture is subsequently heated for 30 minutes under reflux in a nitrogen atmosphere. The precipitate is collected by filtration and purified as in Example 1. Yield: 8.5 g of a product with a cobalt content of 18.4% (theoretical value for a 1:1 complex: 18.7%).

EXAMPLE 3

In accordance with the particulars of Example 1, 24.1 g (0.07 mole) of di-(6-hydroxyhexyl) succinosuccinate are reacted with 44.8 g (0.144 mole) of nickel acetate. The product (19 g) has a nickel content of 12.6% (theoretical value for a 1:1 complex: 12.8% ).

EXAMPLE 4

In accordance with the particulars of Example 1, 12.7 g (0.03 mole) of dioctyl succinosuccinate are reacted with 4.7 g (0.015 mole) of nickel acetate. The product has a nickel content of 10.2% (theoretical value for a 1:1 complex: 10.1%).

EXAMPLE 5

In accordance with the particulars of Example 1, dioleyl succinosuccinate and nickel acetate are reacted in the molar ratio of 2:1. The product has a nickel content of 7.7%, which corresponds to the theoretical value for a 1:1 complex.

EXAMPLE 6

In accordance with the particulars of Example 1, di-(epoxyoleyl) succinosuccinate and nickel acetate are reacted in the molar ratio of 2:1. The resulting nickel complex has a nickel content of 7.3%, which corresponds to the theoretical value for a 1:1 complex.

EXAMPLE 7

| Test of adhesion promoters for rubber on metal | | |
|---|---|---|
| I. Composition | Parts | |
| natural rubber (SMR 5L) | 100.0 | base mix |
| carbon black (Philback N 550) | 60.0 | |
| zinc oxide | 5.0 | |
| stearic acid | 1.0 | |
| aromatic plasticiser oil (Naftolen ZD, Metallgesellschaft AG, Frankfurt) | 5.0 | |
| sulfur | 1.2 | vulcanising system |
| benzothiazyl-2-cyclohexyl-sulfenamide | 1.8 | |
| tetramethylthiuram disulfide | 0.4 | |

II. Preparation of the mixture

The base mixes were prepared as follows in a Werner & Plfeiderer laboratory mixer, Type LH 1: bulk factor: 1.1; rotation: 70 rpm; kneading chamber temperature: 40° C.

| Mixing plan: | Time in minutes |
|---|---|
| 1. masticating the rubber | 1.0 |
| 2. incorporation of stearic acid, ⅓ carbon black and ⅓ oil | 2.0 |
| 3. incorporation of ZnO, ⅓ carbon black and ⅓ oil | 2.0 |
| 4. incorporation of ⅓ carbon black and ⅓ oil | 2.0 |
| 5. final mixing | 0.5 |
| Total mixing time in minutes | 7.5 |
| Final mixing temperature in °C. | 130 |

Each of three batches from the internal mixer (approx. 3.5 kg) was homogenised on a roller for about 2 minutes (roller size 200×450 mm, temperature 40° C., friction 1:1.25) and then the vulcanising system was mixed in (mixing times: 10 to 12 minutes).

III. Manufacture of the test articles

The ready-mixes were divided into portions, the amounts of adhesion promoters, calculated on the parts of rubber, were incorporated on a mixer roller (roller size 100×200 mm, temperatures as indicated above) and rough sheets having a thickness of 5–6 mm were drawn out. Two strips each measuring 13×203 mm (approx. 10 g) were cut from these sheets.

Brass-plated steel cord, consisting of 5 individual strands of 0.22 diameter (brass containing 68% copper) was degreased for 30 minutes in dichloromethane before use and then dried for 20–30 minutes.

The vulcanising mould was preheated for about 3 minutes in a hydraulic hot press and then charged in the following order with: brass reinforcing plate, strips of the rubber mixture, brass-plated steel cord, strips of the rubber mixture, brass reinforcing plate and then the cover of the vulcanising mould. The vulcanising temperature was at 140° C. The curing times resulted from $T_{95}$ of the rheometer curves (time until 95% of the maximum torque has been attained) plus a time allowance of ⅓ $T_{95}$. The wire ends projecting from the test sample were cut off at one narrow side and the narrow side abraded. Rubber adhering to the wires projecting from the other narrow side was carefully removed with a scalpel.

IV. Test Method

The test samples were stored for 18–24 hours at room temperature. With the aid of a Roell & Karthaus universal tensile testing machine RK 100, the vulcanised wires were drawn out of the rubber block in accordance with ASTM Test D 2229-73 and taking into account the modifications described by A. E. Hicks in Rubber Chemistry and Technology, 45, 26-48 (1972).

V. Evaluation

The values reported in the table are the average forces in Newton units, calculated on a thickness of 1 mm, which are necessary to draw the wires from the rubber block. The blank value is the average of all zero values measured in the course of these tests, i.e. of the results obtained with the vulcanised products without adhesion promoter.

TABLE

| Adhesion promoters | Adhesion values (N/mm) |
|---|---|
| blank value | 2.9 |
| 0.5% of nickel acetate | 9.3 |
| 1.0% of nickel acetate | 19.6 |
| 0.5% of Ni-bis[(3,5-di-tert-butyl-4-hydroxybenzyl)phosphonic acid ethyl ester] dihydrate | 12.8 |
| 1.0% of Ni-bis[(3,5-di-tert-butyl-4-hydroxybenzyl)phosphonic acid ethyl ester] dihydrate | 27.5 |
| 0.5% of cobalt naphthenate | 12.8 |
| 1.0% of cobalt naphthenate | 18.6 |
| 0.5% of the compound of Example 1 | 24.5 |
| 1.0% of the compound of Example 1 | 30.4 |

What is claimed is:

1. A nickel or cobalt chelate complex or mixture thereof selected from the group consisting of

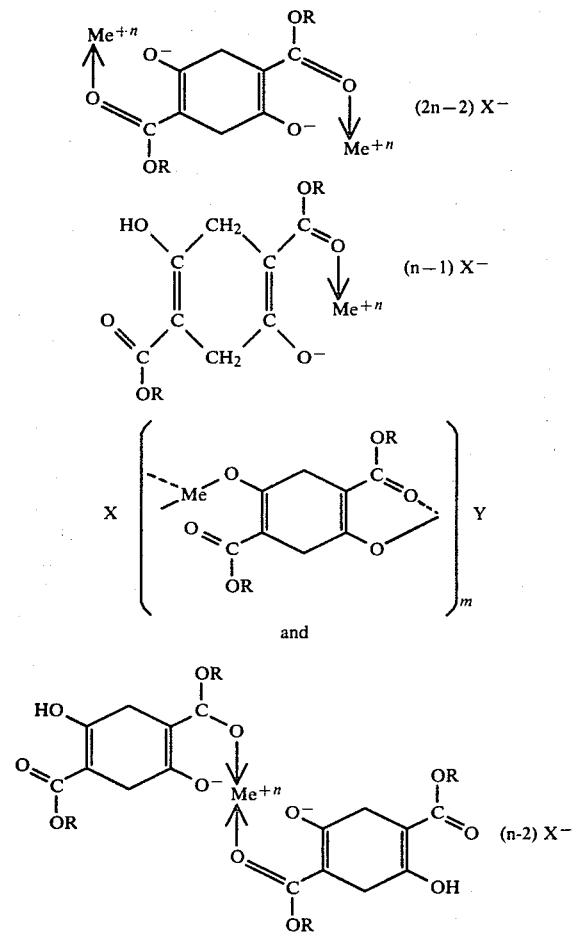

wherein R represents a substituted or unsubstituted hydrocarbon radical of aliphatic or aromatic character, Me is nickel or cobalt, n is 2 or 3, X represents an inorganic or organic anion selected from the group consisting of nitrate, sulfate, phosphate, fluoride, chloride, bromide, iodide, cyanide, cyanate and an organic anion having 1 to 30 carbon atoms said organic anion being a carboxylate, phenolate, alkylphenolate, alkyl sulfate, aryl sulfate, alkylsulfonate, arylsulfonate, alkyl phosphate, aryl phosphate, alkylphosphonate, arylphosphonate, acetylacetonate, benzoylacetonate or quinacridonate, and Y is hydrogen or MeX.

2. A complex according to claim 1 having the structure

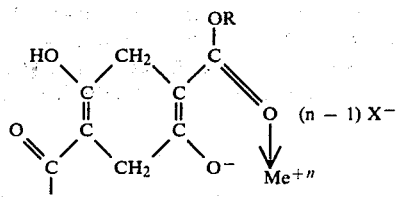

wherein R, Me, n and X are defined as in claim 1.

3. A complex according to claim 1 wherein X is acetate, sulfate, chloride, bromide or acetylacetonate.

4. A complex according to claim 3 wherein X is acetate.

5. A complex according to claim 1 wherein R is alkyl, hydroxyalkyl, alkenyl, cycloalkyl, aryl, aralkyl, alkaryl or alkaralkyl.

6. A complex according to claim 1 wherein R is ethyl, 6-hydroxyhexyl, octyl, oleyl or epoxyoleyl.

7. A vulcanizable elastomer mixture which comprises
   (a) a vulcanizable elastomer, and
   (b) from 0.05 to 10% by weight, based on the elastomer (a), of a nickel or cobalt complex or mixture thereof selected from the group consisting of

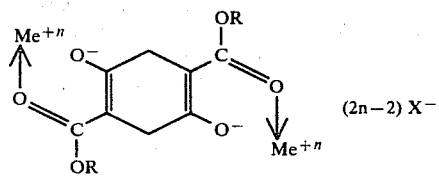

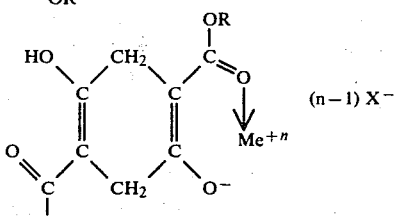

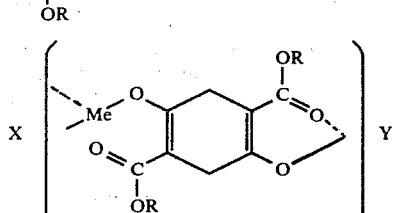

and

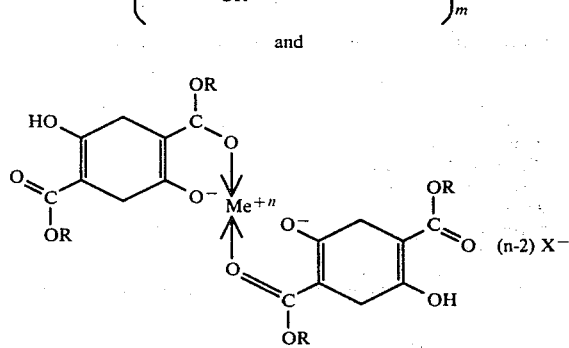

wherein R represents a substituted or unsubstituted hydrocarbon radical of aliphatic or aromatic character, Me is nickel or cobalt, n is 2 or 3, X represents an inorganic or organic anion selected from the group consisting of nitrate, sulfate, phosphate, fluoride, chloride, bromide, iodide, cyanide, cyanate and an organic anion having 1 to 30 carbon atoms, said organic anion being a carboxylate, phenolate, alkylphenolate, alkyl sulfate, aryl sulfate, alkylsulfonate, arylsulfonate, alkyl phosphate, aryl phosphate, alkylphosphonate, arylphosphonate, acetylacetonate, benzoylacetonate or quinacridonate, and Y is hydrogen or MeX.

8. A mixture according to claim 7 containing 0.05 to 5% by weight of component (b), based on the elastomer (a).

9. A mixture according to claim 7 where in component (b) R is ethyl, Me is nickel, n is 2 and X is acetate.

* * * * *